Figure 1:
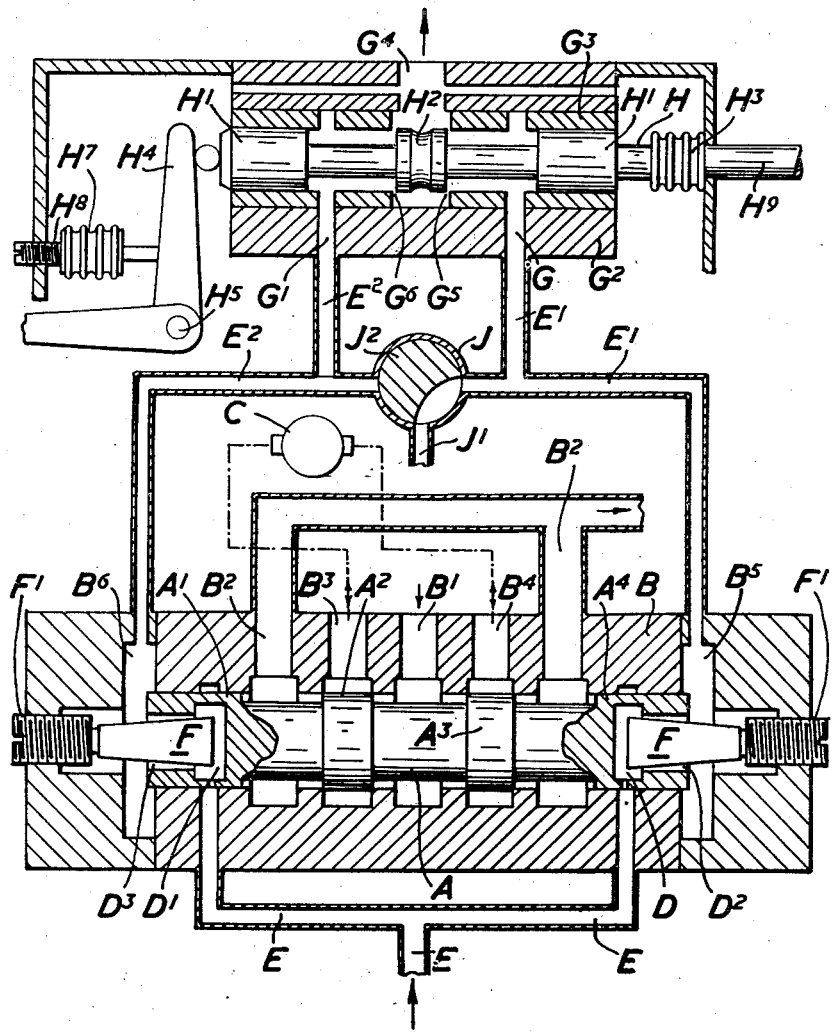

July 1, 1958 — F. B. LEVETUS ET AL — 2,841,168
HYDRAULIC CONTROL VALVE APPARATUS
Filed Nov. 16, 1953 — 4 Sheets-Sheet 1

INVENTORS
FRANCIS B LEVETUS,
GEORGE E. CHITTENDEN,
& NORMAN LEE.

BY
Holcomer, Wathrick & Bowler ATTORNEYS

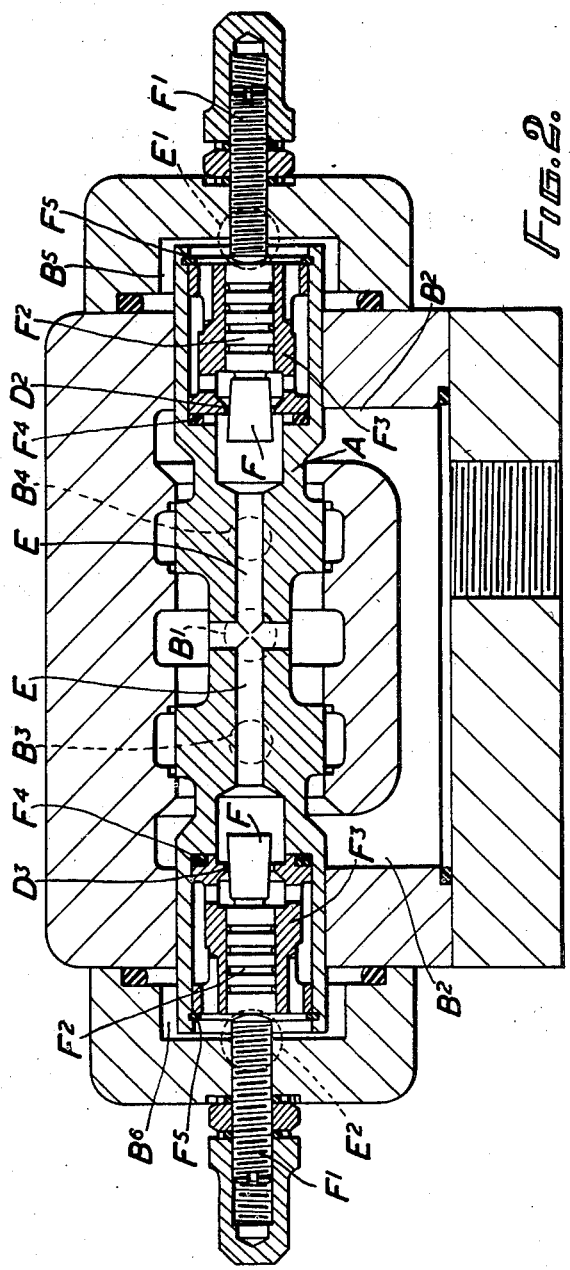

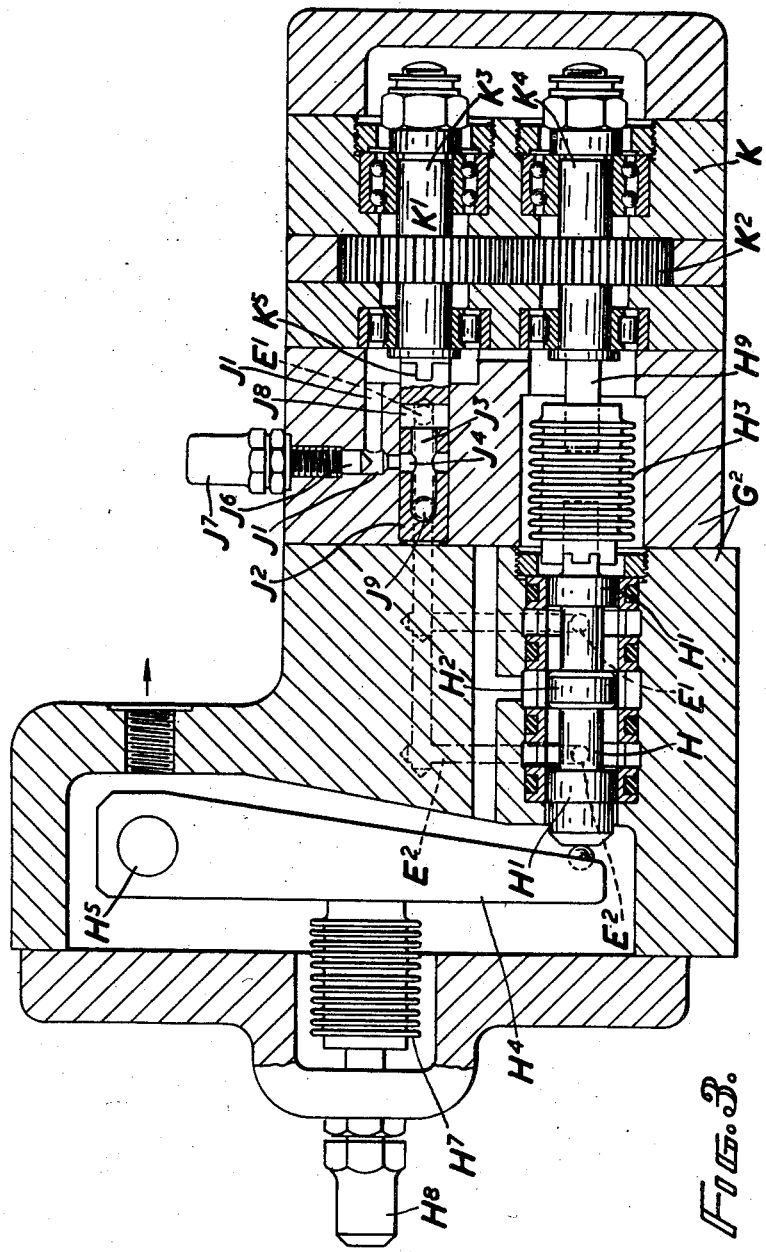

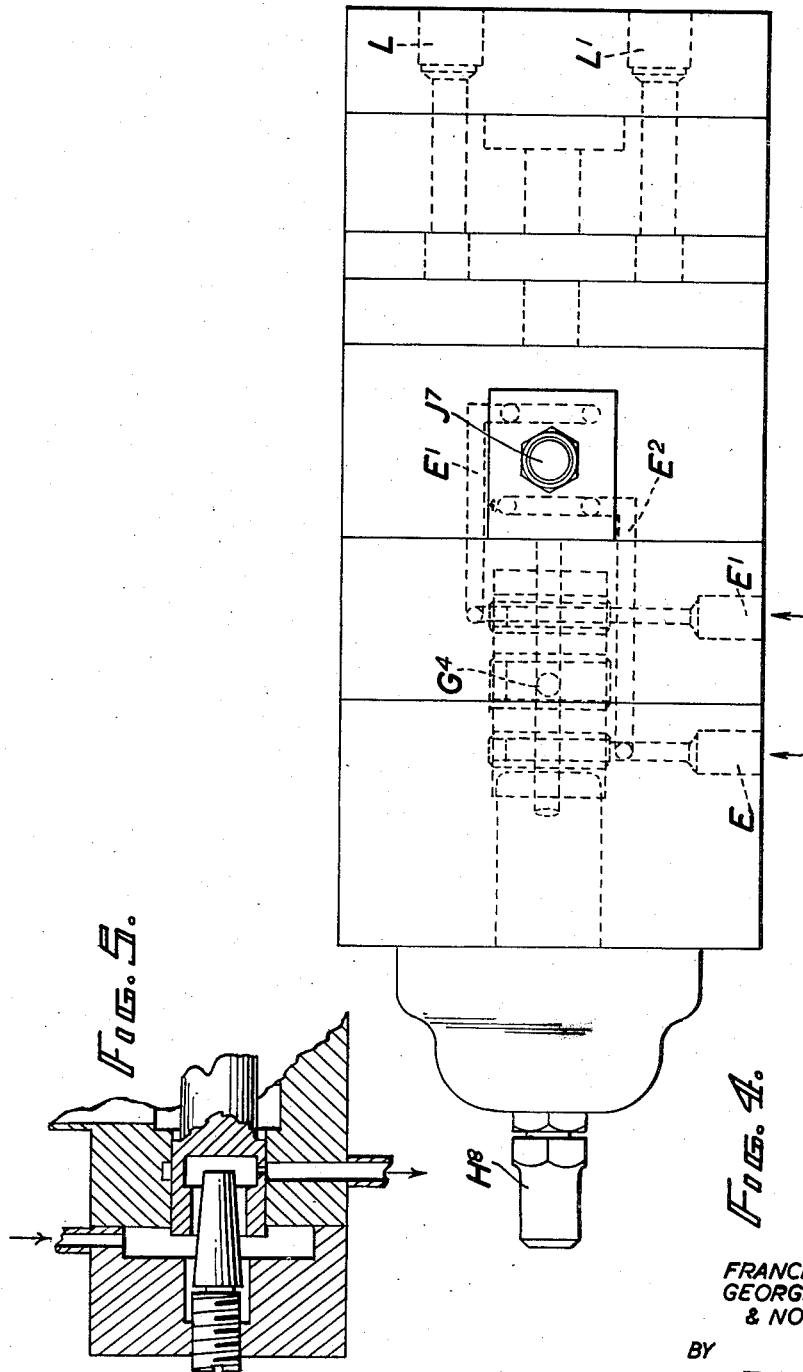

United States Patent Office 2,841,168
Patented July 1, 1958

2,841,168

HYDRAULIC CONTROL VALVE APPARATUS

Francis Benjamin Levetus, George Edward Chittenden, and Norman Lee, Coventry, England, assignors to The Kleelavite Company Limited, Coventry, England, a British company Application November 16, 1953, Serial No. 392,388

Claims priority, application Great Britain November 19, 1952

13 Claims. (Cl. 137—332)

This invention relates to valve apparatus for controlling the supply of working fluid in a hydraulic circulating system and has for its object the provision of control valve apparatus of which the sensitivity can be predetermined within wide limits including if desired a high degree of sensitivity.

Control valve apparatus according to the present invention for controlling the supply of working fluid in a hydraulic circulating system comprises a main valve member of the piston type operating within a cylindrical valve chamber in a valve housing having inlet and outlet ports for the main supply communication between which is controlled by the main valve member, control fluid inlet and outlet passages arranged in pairs, the passages of each pair leading respectively to and from each of the ends of the main valve chamber, one pair functioning as inlet passages and the other pair functioning as outlet passages, a fluid pressure source preferably connected to the control fluid inlet passages, a subsidiary control valve apparatus arranged to control either the two control fluid inlet passages or the two control fluid outlet passages in such manner as to vary progressively the relative effective cross sectional areas of the two passages thus controlled, and a pair of valves (hereinafter called pressure balancing valves) controlling each of the other two of such control fluid passages and arranged to be so controlled by movement of the main valve member that, on any movement of the main valve member resulting from movement of the subsidiary control valve apparatus, the pressure balancing valves move in a sense which tends to bring the pressures in the two ends of the main valve chamber to equality.

The passages controlled by the pressure balancing valves may thus be either the control fluid inlet passages or the control fluid outlet passages, and the fluid pressure source may be connected either to the control fluid inlet passages of the main valve chamber, as shown in Figure 1, or to the subsidiary control valve apparatus, to furnish a constant supply of fluid thereto under pressure.

Thus in one arrangement according to the invention the control fluid inlet passages lead from the source of fluid pressure respectively to the two ends of the main valve chamber through the pressure balancing valves while the subsidiary valve apparatus controls the relative effective cross section of control fluid outlet passages leading from the ends of the main valve chamber, in which case the arrangement is such that each pressure balancing valve progressively opens with movement of the main valve member towards the adjacent end of the main valve chamber; whereas in another arrangement according to the invention the pressure balancing valves control the control fluid outlet passages leading from the ends of the main valve chamber to the exhaust while the subsidiary control valve apparatus controls control fluid inlet passages leading from the source of fluid under pressure, in which case the arrangement is such that each pressure balancing valve opens with movement of the main valve member away from the adjacent end of the main valve chamber.

It will be seen that in any case for any setting of the subsidiary control valve apparatus there will be one position of the main valve member where the latter does not tend to move, and that any displacement of the control valve apparatus will be followed by a corresponding displacement of the main valve member towards and into a new position of equilibrium. Moreover, by providing a pre-determined relationship between the rate at which the effective cross sectional areas for flow of fluid through the passages controlled by the pressure balancing valves with movement of the main valve member and the rate at which the cross sectional areas of the passages controlled by the subsidiary control valve apparatus varies with movement of such apparatus, any desired degree of sensitivity within a wide range can be achieved.

Although in some cases the control fluid flowing through the pressure balancing valves and the control valve apparatus may be derived from a separate source it will generally be preferred to use the source of working fluid as the source of control fluid and one preferred arrangement according to the invention embodying this arrangement is shown by way of example in the accompanying drawings in which Figure 1 is a diagrammatic view in cross section of the control valve apparatus as a whole, Figure 2 is a cross section showing one practical form which the main piston valve and the associated pressure balancing valve may take, Figure 3 is a cross section showing one practical form which the control valve apparatus may take including means for rotating the control valve continuously and for imparting a small degree of continuous vibration to the main valve member, Figure 4 is a plan view of the arrangement shown in Figure 3, and Figure 5 is a fragmentary cross-sectional view showing one end of another advantageous form of main piston valve and associated pressure balancing valve.

In the complete arrangement diagrammatically shown in Figure 1 the apparatus comprises a main valve member A of the piston type operating in a cylindrical valve chamber in a valve housing B having a main inlet port $B^1$, two main exhaust ports $B^2$, $B^2$ and two ports $B^3$, $B^4$ which in use are connected to the inlet and outlet ports of a reversible hydraulic motor indicated diagrammatically at C so that the motor can be driven in one direction or the other according to whether one or other of these ports is connected to a source of fluid pressure while the other is connected to exhaust.

The ports $B^1$, $B^2$, $B^3$, $B^4$ communicate, as shown, with annular chambers within the valve housing B constituted by enlargements of the cylindrical bore in which the valve member A operates, while the valve member A is formed with parts of reduced cross-section connecting four full-diameter lands $A^1$, $A^2$, $A^3$, $A^4$ of which $A^1$ and $A^4$ make close working clearance fits with the ends of the cylindrical bore while $A^2$ and $A^3$ have such longitudinal dimensions that when the valve occupies a central position as shown they just bridge the annular recesses with which the ports $B^3$ and $B^4$ communicate.

It will thus be seen that if the valve member A be moved to the left from the position shown the port $B^4$ will be brought into communication with the exhaust port $B^2$ while the port $B^3$ will be brought into communication with the inlet port $B^1$, whereas, if this valve member be moved to the right from the central position shown, the port $B^3$ will be brought into communication with the exhaust port $B^2$ and the port $B^4$ will be brought into communication with the inlet port $B^1$. Thus the motor C can be caused to rotate in one direction or the other and it will be seen that the speed of rotation will be determined by the degree to which the valve member A is displaced in one direction or the other from its central position.

Formed in the ends of the valve member A are chambers D, $D^1$ (herein referred to as pressure balancing valve chambers) which communicate through cylindrical bores $D^2$, $D^3$ with chambers $B^5$, $B^6$ at the ends of the main valve chamber in the housing B. The chambers D, $D^1$ are in free communication through appropriate ports in the main valve member A and control fluid inlet passages E with a source of fluid pressure, which for convenience in the diagrammatic illustration in Figure 1 is shown as separate from the passage $B^1$ although in practice it would normally be constituted by this passage. Thus while in Figure 1 for convenience of illustration the chambers D, $D^1$ are shown as communicating with the separate passage E, in the preferred practical construction as shown in Figure 2 and subsequently described these chambers communicate directly through control fluid inlet passages in the valve member A with the passage $B^1$.

Extending through each of the bores $D^2$, $D^3$ into the appropriate pressure balancing valve chambers D, $D^1$ is a pressure balancing valve member F which is adjustable by means of a screwthreaded member indicated at $F^1$ but is normally stationary with respect to the valve housing B and has the tapered form shown. It will thus be seen that, if the valve member A be moved to the left in Figure 1 the cross-sectional area of the passage for flow of fluid from the chamber $D^1$ into the chamber $B^6$ will be progressively increased while that for flow of fluid from the chamber D into the chamber $B^5$ will be progressively reduced and vice versa.

The chambers $B^5$ and $B^6$ communicate through control fluid outlet passages $E^1$, $E^2$ with ports G, $G^1$ in a subsidiary valve housing $G^2$ in which is mounted a cylindrical liner $G^3$ having inlet ports constituting end portions of the passages $G^1$, and an exhaust $G^4$. Arranged within the cylindrical liner $G^3$ is a subsidiary valve member H having end lands $H^1$ which close the ends of the bore of the liner $G^3$ and an intermediate land $H^2$ constituting the valve proper which is arranged to control the effective cross-section for the flow of fluid through two slots $G^5$, $G^6$ between its opposite ends and the edges of the port $G^4$. The subsidiary valve member H is acted upon in one direction by a spring in the form of a corrugated diaphragm $H^3$ and in the other direction by a control lever $H^4$ on a control shaft $H^5$, which control lever is itself acted upon by a further spring in the form of a diaphragm $H^7$ which is adjustable by means of a screw adjusting device $H^8$ and serves to counter-balance the force of the spring $H^3$ and thus provide a means for adjusting the initial setting of the valve member H. The passages $E^1$ and $E^2$ communicate with the housing J of a rotary valve having a relief passage $J^1$ and containing a rotary valve member $J^2$ so formed that as the rotary valve member $J^2$ rotates it brings the passages $E^1$ and $E^2$ alternately and momentarily into communication with the relief passage $J^1$.

In practice means are provided for rotating a shaft $H^9$ which is connected to the end of the diaphragm $H^3$ remote from the valve member H and the rotary valve member $J^2$ continuously thus reducing the forces necessary to cause movement of the valve member H under the action of the lever $H^4$ and also creating pulsations in the passages $E^1$, $E^2$ which tend to maintain the valve member A in a continuous state of rapid axial vibration, whereby the sensitivity of the whole apparatus tends to be increased.

The sequence of operations of the subsidiary control valve apparatus and the main valve member resulting from movement of the control valve member $H^2$ to the left by means of the lever $H^4$, for example, may be explained as follows: first, the pressure in left hand valve chamber $B^6$ will rise and that in the right hand valve chamber will fall, moving the main valve member A to the right and causing the left hand pressure balancing valve $D^3$ to close and the right hand pressure balancing valve $D^2$ to open, thus reducing the pressure in the left hand chamber $B^6$ and increasing the pressure in the right hand chamber $B^5$, and this action continues until the two pressures become equal and the main valve member A is balanced in its new position.

In the practical construction of main valve shown in Figure 2 the appropriate parts have been allotted the same reference letters as the corresponding parts in Figure 1 and the general construction and operation of this valve will thus be clear from the above description of Figure 1 and will not be here repeated. The following features of the practical construction shown in Figure 2 are, however, described for the sake of further clarity.

It will be apparent that the passages E in the construction shown in Figure 2 are formed in the valve member A and thus communicate directly with the passage $B^1$. It will also be seen that the pressure balancing valve members F include piston-like guide parts $F^2$ mounted to slide within housings $F^3$ which are rigidly mounted in cylindrical chambers in the ends of the valve member A in which they are held against ring type seals $F^4$ by circlips $F^5$, the housings $F^3$ being formed to provide the necessary communication between the cylindrical bores $D^2$, $D^3$ controlled by the valve members F and the chambers $B^5$, $B^6$. It will be moreover seen that in this construction the outer ends of the parts $F^2$ of the valve members F merely bear against the adjusting screws $F^1$ in contact with which they are maintained by the fluid pressure acting on the inner ends of the valve members F.

In the arrangement of subsidiary valve apparatus shown in Figures 3 and 4 the appropriate parts have again been allotted the same reference letters as the corresponding parts in Figure 1. It will thus be seen that the passages $E^1$, $E^2$ communicate with the appropriate points in a cylindrical valve chamber containing the valve member H with its lands $H^1$, $H^2$, which valve member is acted upon at one end by the lever $H^4$ on its operating shaft $H^5$, this lever being acted upon by a spring in the form of a corrugated diaphragm $H^7$ adjustable by means of an adjusting screw $H^8$. Moreover the end of the valve member H remote from the lever $H^4$ is connected to one end of a spring in the form of a corrugated diaphragm $H^3$ the other end of which is connected to a shaft $H^9$ which is arranged to be continuously rotated. The passages $E^1$, $E^2$ also, as indicated, communicate with opposite sides of a bore containing a rotary valve member $J^2$. In the arrangement shown in Figures 3 and 4 this valve member $J^2$ has a hollow bore $J^3$ which communicates at all times through transverse ports $J^4$ with a relief passage $J^1$ controlled by an adjustable valve member $J^6$, which valve member is adjustable from outside the casing by means of an adjusting screw indicated at $J^7$, while the bore $J^3$ also communicates with two pairs of transverse ports $J^8$, $J^9$ arranged at right angles to one another so that during rotation of the valve member $J^2$ the ports $J^8$ and $J^9$ come alternately into communication with the passages $E^1$ and $E^2$ and thus alternately bring these passages into communication with the relief passage $J^1$.

It will thus be seen that during rotation of the valve $J^2$ the passages $E^1$ and $E^2$ are alternately connected to the relief passage $J^1$ for short periods so as momentarily to relieve the pressures therein to a degree determined by the setting of the valve member $J^6$. The valve member $J^2$ and the shaft $H^9$ are arranged to be continuously rotated during operation of the apparatus by a hydraulic motor of the gear wheel type comprising a casing K secured to the end of the valve housing G² and having the usual two intermeshing gear wheel type rotors K¹, K² mounted on shafts K³, K⁴ supported in bearings in the casing K. The shafts K³, K⁴ are connected respectively by a dog type coupling K⁵ to the valve J² and directly to one end of the diaphragm H³ the other end of which is connected by a dog type coupling to the valve member H.

It will be understood that the casing of the gear wheel type hydraulic motor K is provided with the usual inlet and outlet ports for the admission and exit of working fluid as indicated at L and L¹ in Figure 4 but the construction of this motor will not be further described since it is of well known type and in itself forms no part of the present invention.

It will be appreciated that the arrangement diagrammatically shown in Figure 1 could be modified, by connecting the passage G⁴ to the source of working fluid under pressure, connecting the passages E to exhaust, and reversing the taper of the parts F as shown in Figure 5, wherein the main valve member A⁴ is similar to that shown in Figure 1 but the adjustable pressure balancing valve F⁹ tapers inwardly towards its inner end where it enters the chamber D¹ in the adjacent end of the main valve member and the passages E and E² are respectively for outlet and inlet control fluid.

What we claim as our invention and desire to secure by Letters Patent is:

1. Control valve apparatus for controlling the supply of working fluid in a hydraulic circulating system comprising a main valve member of the piston type operating within a cylindrical valve chamber in a valve housing having inlet and outlet ports communication between which is controlled by the main valve member, control fluid inlet and outlet passages leading respectively to and from each of the ends of the main valve chamber a fluid pressure source connected to the control fluid inlet passages, a subsidiary control valve apparatus arranged to control simultaneously two functionally alike control fluid passages in such manner as to vary progressively the relative effective cross sectional areas of the two passages thus controlled, and two pressure balancing valves controlling respectively each a different one of the other two of such control fluid passages and arranged to be so controlled by movement of the main valve member that, on any movement of the main valve member resulting from movement of the subsidiary control valve apparatus, the pressure balancing valves move in a sense which tends to bring the pressures in the two ends of the main valve chamber to equality.

2. Control valve apparatus for controlling the supply of working fluid to a hydraulic circulating system comprising a main valve member of the piston type operating within a cylindrical valve chamber in a valve housing having inlet and outlet ports communication between which is controlled by the main valve member, control fluid inlet passages leading from a source of fluid pressure respectively to the two ends of the valve chamber through pressure balancing valves arranged to control the effective cross sectional area for flow of control fluid through the control fluid inlet passages and arranged to be moved automatically by movement of the main valve member so that each pressure balancing valve progressively opens its passage as the main valve member moves towards the adjacent end of the valve chamber and vice versa, and a subsidiary control valve apparatus controlling control fluid outlet passages for the flow of control fluid from the ends of the main valve chamber and arranged by its movement to vary progressively the relative effective cross sections of such control fluid outlet passages.

3. Control valve apparatus for controlling the supply of working fluid to a hydraulic circulating system comprising a main valve member of the piston type operating within a cylindrical valve chamber in a valve housing having inlet and outlet ports communication between which is controlled by the main valve member, control fluid inlet passages leading from a source of fluid pressure respectively to the two ends of the valve chamber, subsidiary control valve apparatus controlling the control fluid inlet passages and arranged by its movement to vary progressively the relative effective cross sections of such inlet passages, control fluid outlet passages leading from the ends o fthe valve chamber, and pressure balancing valves arranged to control the effective cross sectional areas of the control fluid outlet passages and to be moved automatically by movement of the main valve member so that each pressure balancing valve progressively opens its control fluid outlet passage as the main valve member moves away from the adjacent end of the main valve chamber and vice versa.

4. Control valve apparatus as claimed in claim 1 in which the passages controlled by the pressure balancing valves are formed in the main valve member and extend through cylindrical pressure balancing valve chambers in its ends, while each pressure balancing valve comprises a piston valve arranged to slide relatively to the main valve member in the appropriate pressure balancing valve chamber and to bear against the adjacent end of the main valve chamber so as to be moved relatively to the main valve member automatically as the main valve member moves in its chamber.

5. Control valve apparatus as claimed in claim 4 in which the subsidiary valve apparatus comprises a subsidiary valve member of the piston type operating within a subsidiary cylindrical valve chamber and having lands which control the flow of fluid respectively through the appropriate two control fluid passages communicating respectively with the ends of the main valve chamber.

6. Control valve apparatus as claimed in claim 1 in which the subsidiary valve apparatus comprises a subsidiary valve member of the piston type operating within a subsidiary cylindrical valve chamber and having lands which control the flow of fluid respectively through the appropriate two control fluid passages communicating respectively with the ends of the main valve chamber.

7. Control valve apparatus as claimed in claim 1 in which means are provided for continuously causing the pressure in one of the control fluid passages controlled by the subsidiary control valve apparatus to oscillate to a small degree relatively to that in the other of such passages so as to tend to maintain the main valve member in a state of comparatively rapid vibration.

8. Control valve apparatus as claimed in claim 7 in which the means for causing the pressure to oscillate comprises a vibration-producing valve member which intermittently connect at least one of the two passages concerned to a relief passage.

9. Control valve apparatus as claimed in claim 8 in which a control member is provided for varying the effective cross sectional area of the relief passage.

10. Control valve apparatus as claimed in claim 1 including means for causing the pressure in a least one of the control fluid passages controlled by the subsidiary valve apparatus to oscillate, comprising a vibration-producing rotary valve member which intermittently connects the said control fluid passage to a relief passage, and a motor arranged to rotate both the vibration-producing valve member and the subsidiary control valve member continuously.

11. Control valve apparatus as claimed in claim 10 including means for varying the effective cross sectional area of the relief passage.

12. Control valve apparatus as claimed in claim 1 including a rotary valve member arranged to connect at least one of the control fluid passages controlled by the subsidiary valve apparatus intermittently to a relief passage, and a hydraulic motor of the gear wheel type having two gear wheel rotors one of which is directly connected to the said rotary valve member and the other to the subsidiary control valve member to rotate the latter.

13. Control valve apparatus as claimed in claim 12 including means for varying the effective cross section of the relief passage.

References Cited in the file of this patent

UNITED STATES PATENTS

| | | |
|---|---|---|
| 2,455,315 | Rose et al. | Nov. 30, 1948 |
| 2,582,088 | Walthers | Jan. 8, 1952 |
| 2,621,676 | Loft | Dec. 16, 1952 |

UNITED STATES PATENT OFFICE

CERTIFICATE OF CORRECTION

Patent No. 2,841,168                                       July 1, 1958

Francis Benjamin Levetus et al.

It is hereby certified that error appears in the above numbered patent requiring correction and that the said Letters Patent should read as corrected below.

In the grant, lines 3 and 13, and in the heading to the printed specification, lines 4 and 5, name of assignee, for "The Kleelavite Company Limited" read -- The Keelavite Company Limited --.

Signed and sealed this 4th day of November 1958.

(SEAL)

Attest:
KARL H. AXLINE

Attesting Officer

ROBERT C. WATSON
Commissioner of Patents